Dec. 26, 1950  A. J. VON BANK  2,535,468
COMBINATION COUPLING PIN AND LIFTING HOOK
Filed June 10, 1949

Inventor
Albert J. Von Bank
By John N. Randolph
Attorney

Patented Dec. 26, 1950

2,535,468

UNITED STATES PATENT OFFICE 2,535,468

COMBINATION COUPLING PIN AND LIFTING HOOK

Albert J. Von Bank, Armstrong, Iowa

Application June 10, 1949, Serial No. 98,367

3 Claims. (Cl. 280—33.15)

This invention relates to a novel combination coupling pin for coupling the tongue of a wagon or trailer to the drawbar of a tractor or draft vehicle and a lifting hook, forming a part of the unit, for cooperation with the pin to prevent accidental disengagement of the pin from the coupled draft bar and tongue and for additionally functioning in cooperation with the coupling pin for engaging, lifting and properly positioning the tongue to be coupled with the drawbar.

Still a further object of the invention is to provide a combination coupling pin and lifting hook of extremely simple construction and which is capable of being utilized by the operator of a draft vehicle or tractor while seated on the operator's seat thereof for coupling the draft vehicle to a trailer vehicle and without being required to dismount from the draft vehicle and assume a position between the vehicles where injury might result to the operator should either vehicle roll toward the other.

Various other objects and advantages of the invention will hereinafter become more fully apparent from the following description of the drawing, illustrating a presently preferred embodiment of the invention, and wherein.

Figure 1:
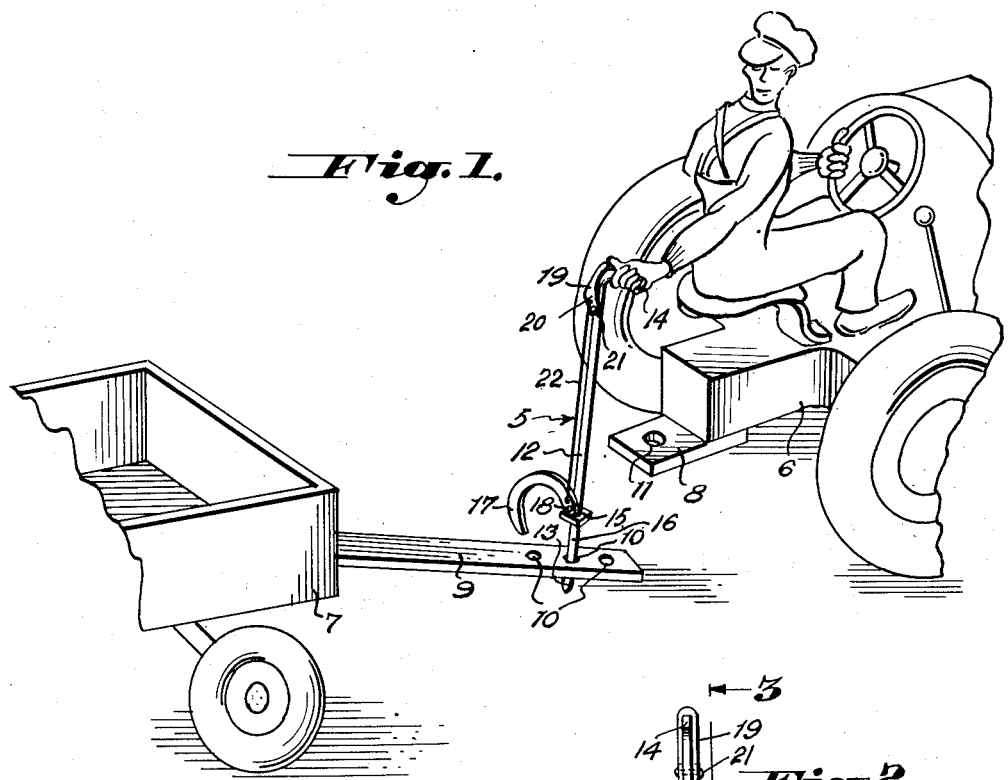
Figure 1 is a fragmentary perspective view showing portions of a draft vehicle and a trailer vehicle and with the invention shown in an initial position for use for coupling the tongue of the trailer vehicle to the drawbar of the draft vehicle.
Figure 2:
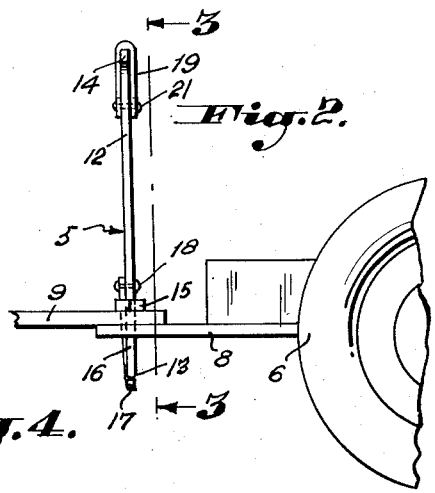
Figure 2 is a fragmentary side elevational view of a portion of the draft vehicle and tongue of the trailer vehicle and showing the coupling pin and lifting hook in an applied position for coupling the vehicles together.

For the purpose of illustrating one application and use of the combination coupling pin and lifting hook, designated generally 5, comprising the invention, the rear portion of a draft vehicle such as a tractor 6 and the forward portion of a trailer vehicle, such as a wagon 7 have been partially illustrated in Figures 1 and 2, the draft vehicle 6 being shown provided with a rearwardly extending drawbar 8 and the trailer vehicle or wagon 7 being shown provided with a forwardly extending tongue 9. The tongue 9 is shown adjacent its forward end provided with a series of longitudinally spaced coupling pin receiving openings 10 adapted to be selectively aligned with a single coupling pin receiving opening 11 of the drawbar 8 for connecting the draft vehicle and trailer vehicle by a coupling pin extending through the aligned openings 10 and 11.

The combination coupling pin and lifting hook 5, constituting the invention, includes an elongated rod 12 having a tapered or pointed lower end 13 and a laterally turned opposite upper end forming a handle 14. A collar 15 is fixedly secured to the rod 12 near but spaced from its pointed lower end 13 and the rod portion disposed between said collar 15 and end 13 constitutes a coupling pin 16.

A hook 17 of arcuate shape throughout its length is pivotally connected near one end thereof to the rod 12, above and adjacent the collar 15 by a pin 18 which extends loosely therethrough and through said rod 12 and which is provided with headed ends, as seen in Figure 2 to prevent disengagement of the pin from the rod 12 or hook 17. A lever 19 has a bifurcated angularly extending end 20 the free portions of the furcations of which straddle the rod 12 near the handle 14. A pin 21 extends through said furcations and loosely through the rod 12 for pivotally mounting the lever 19 thereon, said pin 21 likewise having headed ends to retain it in engagement with the bifurcated lever portion 20 and the rod 12, as seen in Figure 2.

A substantially rigid connecting rod or link 22 is disposed substantially parallel to the rod 12 and has a hook shaped upper end 23 which pivotally engages in an opening 24 of the lever 19 and a hook shaped lower end 25, which is disposed at a right angle to the hook 23 and which loosely engages in an opening 26 of the hook 17. Said opening 26 is disposed near the pivoted end of the hook 17, as clearly illustrated in Figures 3 and 4.

Figure 3:
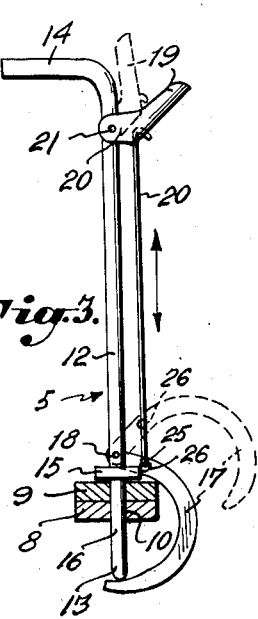
Figure 3 is a sectional view taken substantially along a plane as indicated by the line 3—3 of Figure 2 and showing the coupling pin and lifting hook in side elevation and at right angles to its position as seen in Figure 2, and on an enlarged scale.
Figure 4:
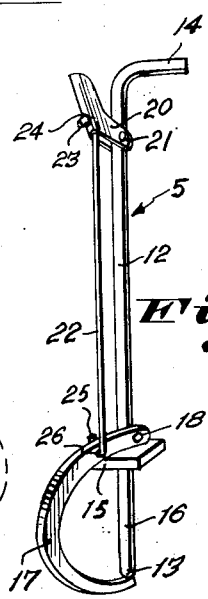
Figure 4 is a perspective view showing the coupling pin and lifting hook detached and with the lifting hook in its normal position.

The lever 19 projects from the rod 12 in the opposite direction to the handle 14. The weight of the hook 17 normally causes said hook to assume an operative position and with the bill thereof disposed beneath the point 13 of the coupling pin 16 and with a portion of the hook resting on the collar 15 which thus functions as a stop for limiting the gravity movement of the hook 17 toward an operative position. With the hook 17 thus disposed, as illustrated in Figures 3 and 4, the coupling pin 16 functions to close said hook and the lever 19 is held in its position of Figures 3 and 4 by the weight of the hook. To utilize the combination coupling pin and lifting hook, an operator of the draft vehicle 6 while seated on the operator's seat thereof, as illustrated in Figure 1, may grasp the handle 14 with one hand and with the thumb of said hand engage and swing the lever 19 toward the handle 14 to swing the hook 17 upwardly to an open position, as seen in Figure 1 and in dotted lines in Figure 3. The point 13 of the pin 16 will thereby be exposed so that it may be inserted through one of the openings 10 of the tongue 9. By then releasing the lever 19, the weight of the hook 17 will cause said hook and lever 19 to assume the positions as seen in Figure 4 so that the bill or free end of the hook 17 will be positioned beneath the tongue 9 and may be utilized for then lifting the tongue and positioning its free end on the drawbar 8 and with one of the openings 10 thereof substantially in registry with the opening 11. The hook 17 is then again retracted or elevated, as previously described, so that the coupling pin 16 can be disengaged from the tongue 9 and engaged with the registering openings 10 and 11 and will function as a drift pin to bring said openings into complete registry, if necessary. After the pin 16 has been positioned to engage the registering openings 10 and 11, as illustrated in Figures 2 and 3, the lever 19 is released to permit the hook 17 to return to its position of Figures 2 and 3, from its dotted line position of Figure 3 and so that the hook 17 will then function to prevent the coupling pin 16 from being disengaged from the openings 10 and 11 until said hook 17 is again retracted to its dotted line position of Figure 3. It will thus be seen that the coupling pin 16 and hook 17 each perform a dual function in cooperation each with the other and that through the use of the combination coupling pin and lifting hook 5 a trailer vehicle 7 may be coupled with or uncoupled from a draft vehicle 6 by an operator and while seated on the draft vehicle. The collar 15 additionally functions as a stop for limiting the downward movement of the coupling pin 16 through the openings 10 and 11 and for supporting the unit 5 on the tongue 9, as illustrated in Figures 2 and 3.

Various modifications and changes are contemplated and may obviously be resorted to, without departing from the spirit or scope of the invention as hereinafter defined by the appended claims.

I claim as my invention:

1. A combination coupling pin and lifting hook comprising a rod having a lower portion defining a coupling pin, a hook pivotally connected to the rod above the coupling pin for swinging movement in a plane substantially parallel to the axis of the pin, said hook being gravity urged to swing toward the pin for positioning the free end of the hook in a position adjacent the coupling pin, said hook functioning as a stop means to releasably retain the coupling pin in engagement with openings of elements to be coupled thereby, and said pin functioning as a closure for the hook opening for retaining the hook in engagement with elements to be lifted thereby, said rod having a laterally projecting opposite, upper end disposed remote to the hook and coupling pin and forming a handle, and manually actuated means disposed adjacent said handle and connected to the hook for swinging the hook upwardly on its pivot and away from the coupling pin.

2. A combination coupling pin and lifting hook comprising a rod having a lower portion defining a coupling pin, a hook pivotally connected to the rod above the coupling pin for swinging movement in a plane substantially parallel to the axis of the pin, said hook being gravity urged to swing toward the pin for positioning the free end of the hook in a position adjacent the coupling pin, said hook functioning as a stop means to releasably retain the coupling pin in engagement with openings of elements to be coupled thereby, and said pin functioning as a closure for the hook opening for retaining the hook in engagement with elements to be lifted thereby, said rod having a laterally projecting opposite, upper end disposed remote to the hook and coupling pin and forming a handle, a manually actuated lever element pivotally mounted on the rod adjacent said handle, and a link pivotally connected to the lever element and to said hook for swinging the hook on its pivot upwardly and away from the coupling pin when said lever element is swung toward the handle.

3. A combination coupling pin and lifting hook comprising a rod having a lower portion defining a coupling pin, a hook pivotally connected to the rod above the coupling pin for swinging movement in a plane substantially parallel to the axis of the pin, said hook being gravity urged to swing toward the pin for positioning the free end of the hook in a position adjacent the coupling pin, said hook functioning as a stop means to releasably retain the coupling pin in engagement with openings of elements to be coupled thereby, and said pin functioning as a closure for the hook opening for retaining the hook in engagement with elements to be lifted thereby, said rod having a laterally projecting opposite, upper end disposed remote to the hook and coupling pin and forming a handle, a manually actuated lever element pivotally mounted on the rod adjacent said handle, a link pivotally connected to the lever element and to said hook for swinging the hook on its pivot upwardly and away from the coupling pin when said lever element is swung toward the handle, and a collar fixed to said rod between the coupling pin and the pivoted end of said hook and forming a stop for limiting the downward swinging movement of the hook toward the coupling pin and additionally functioning as a stop for supporting the coupling pin applied to openings of elements to be coupled thereby.

ALBERT J. VON BANK.

REFERENCES CITED

The following references are of record in the file of this patent:

UNITED STATES PATENTS

| Number | Name | Date |
|---|---|---|
| 2,072,391 | Varney | Mar. 2, 1937 |
| 2,224,522 | Peterson | Dec. 10, 1940 |
| 2,483,111 | Spillman | Sept. 27, 1949 |